MINIATURIZED ELECTRONIC CIRCUITS

Filed Feb. 6, 1959 4 Sheets-Sheet 1

INVENTOR
Jack S. Kilby

BY
Stevens, Davis, Miller & Mosher
ATTORNEYS

June 23, 1964 J. S. KILBY 3,138,743

MINIATURIZED ELECTRONIC CIRCUITS

Filed Feb. 6, 1959 4 Sheets-Sheet 2

INVENTOR

Jack S. Kilby

BY

Stevens, Davis, Miller & Mosher

ATTORNEYS

INVENTOR
Jack S. Kilby

BY
Stevens, Davis, Miller & Mosher
ATTORNEYS

INVENTOR
Jack S. Kilby
BY Stevens, Davis, Miller & Mosher
ATTORNEYS

United States Patent Office 3,138,743

Patented June 23, 1964

3,138,743

MINIATURIZED ELECTRONIC CIRCUITS

Jack S. Kilby, Dallas, Tex., assignor to Texas Instruments Incorporated, Dallas, Tex., a corporation of Delaware Filed Feb. 6, 1959, Ser. No. 791,602
25 Claims. (Cl. 317—101)

Figure 1:
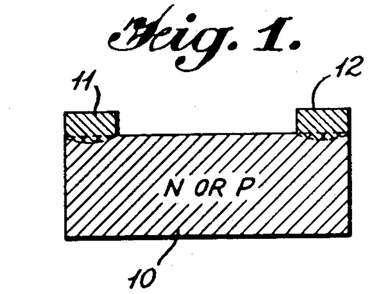

This invention relates to miniature electronic circuits, and more particularly to unique integrated electronic circuits fabricated from semiconductor material.

Many methods and techniques for miniaturizing electronic circuits have been proposed in the past. At first, most of the effort was spent upon reducing the size of the components and packing them more closely together. Work directed toward reducing component size is still going on but has nearly reached a limit. Other efforts have been made to reduce the size of electronic circuits such as by eliminating the protective coverings from components, by using more or less conventional techniques to form components on a single substrate, and by providing the components with a uniform size and shape to permit closer spacings in the circuit packaging therefor.

All of these methods and techniques require a very large number and variety of operations in fabricating a complete circuit. For example, of all circuit components, resistors are usually considered the most simple to form, but when adapted for miniaturization by conventional techniques, fabrication requires at least the following steps:

(*a*) Formation of the substrate.
(*b*) Preparation of the substrate.
(*c*) Application of terminations.
(*d*) Preparation of resistor material.
(*e*) Application of the resistor material.
(*f*) Heat treatment of the resistor material.
(*g*) Protection or stabilization of the resistor.

Capacitors, transistors, and diodes when adapted for miniaturization each require at least as many steps in the fabrication thereof. Unfortunately, many of the steps required are not compatible. A treatment that is desirable for the protection of a resistor may damage another element, such as a capacitor or transistor, and as the size of the complete circuit is reduced, such conflicting treatments, or interactions, become of increasing importance. Interactions may be minimized by forming the components separately and then assembling them into a complete package, but the very act of assembly may cause damage to the more sensitive components.

Because of the large number of operations required, control over miniaturized circuit fabrication becomes very difficult. To illustrate, many raw materials must be evaluated and controlled even though they may not be well understood. Further, many testing operations are required and, even though a high yield may be obtained for each operation, so many operations are required that the over-all yield is often quite low. In service, the reliability of a circuit produced by methods of such complexity may also be quite low due to the tremendous number of controls required. Additionally, the separate formation of individual components requires individual terminations for each component. These terminations may eventually become as small as a dot of conductive paint. However, they still account for a large fraction of the usable area or volume of the circuit and may become an additional cause of circuit failure or rejection due to misalignment.

In contrast to the approaches to miniaturization that have been made in the past, the present invention has resulted from a new and totally different concept for miniaturization. Radically departing from the teachings of the art, it is proposed by the invention that miniaturization can best be attained by use of as few materials and operations as possible. In accordance with the principles of the invention, the ultimate in circuit miniaturization is attained using only one material for all circuit elements and a limited number of compatible process steps for the production thereof.

The above is accomplished by the present invention by utilizing a body of semiconductor material exhibiting one type of conductivity, either n-type or p-type, and having formed therein a diffused region or regions of appropriate conductivity type to form a p-n junction between such region or regions and the semiconductor body or, as the case may be, between diffused regions. According to the principles of this invention, all components of an entire electronic circuit are fabricated within the body so characterized by adapting the novel techniques to be described in detail hereinafter. It is to be noted that all components of the circuit are integrated into the body of semiconductor material and constitute portions thereof.

In a more specific conception of the invention, all components of an electronic circuit are formed in or near one surface of a relatively thin semiconductor wafer characterized by a diffused p-n junction or junctions. Of importance to this invention is the concept of shaping. This shaping concept makes it possible in a circuit to obtain the necessary isolation between components and to define the components or, stated differently, to limit the area which is utilized for a given component. Shaping may be accomplished in a given circuit in one or more of several different ways. These various ways include actual removal of portions of the semiconductor material, specialized configurations of the semiconductor material such as long and narrow, L-shaped, U-shaped, etc., selective conversion of intrinsic semiconductor material by diffusion of impurities thereinto to provide low resistivity paths for current flow, and selectve conversion of semiconductor material of one conductivity type to conductivity of the opposite type wherein the p-n junction thereby formed acts as a barrier to current flow. In any event, the effect of shaping is to direct and/or confine paths for current flow thus permitting the fabrication of circuits which could not otherwise be obtained in a single wafer of semiconductor material. As a result, the final circuit is arranged in essentially planar form. It is possible to shape the wafer during processing and to produce by diffusion the various circuit elements in a desired and proper relationship. Certain of the resistor and capacitor components described herein have utility and novelty in and of themselves although they are completely adaptable to and perhaps find their greatest utility as integral parts of the semiconductor electronic circuit hereof.

It is, therefore, a principal object of this invention to provide a novel miniaturized electronic circuit fabricated from a body of semiconductor material containing a diffused p-n junction wherein all components of the electronic circuit are completely integrated into the body of semiconductor material.

It is another principal object of this invention to produce desired circuits by appropriately shaping a wafer of semiconductor material to obtain the necessary isolation between components thereof and to define the areas utilized by such components.

It is a further object of this invention to provide a unique miniaturized electronic circuit fabricated as described whereby the resulting electronic circuit will be substantially smaller, more compact, and simpler than circuit packages heretofore developed using known techniques.

It is a still further object of this invention to provide novel miniaturized electronic circuits fabricated as described above which involve less processing than techniques heretofore used for this purpose.

It is a primary object of the invention to provide a miniaturized electronic circuit wherein the active and passive circuit components are integrated within a body of semiconductor material, the junctions of such components being near and/or extending to one face of the body, with components being spaced or electrically separated from one another as necessary in the circuit. These features permit a versatility in design of integrated circuits not heretofore available.

Figure 6A:
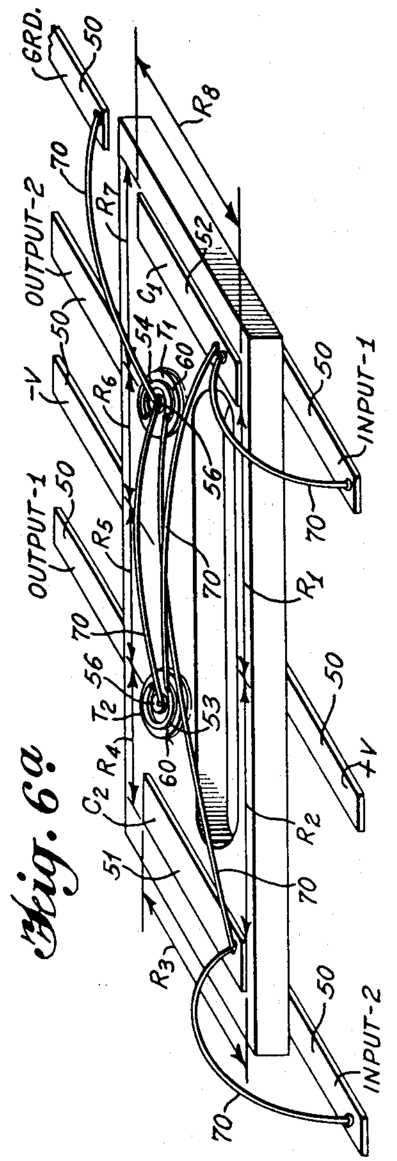
Figure 6B:
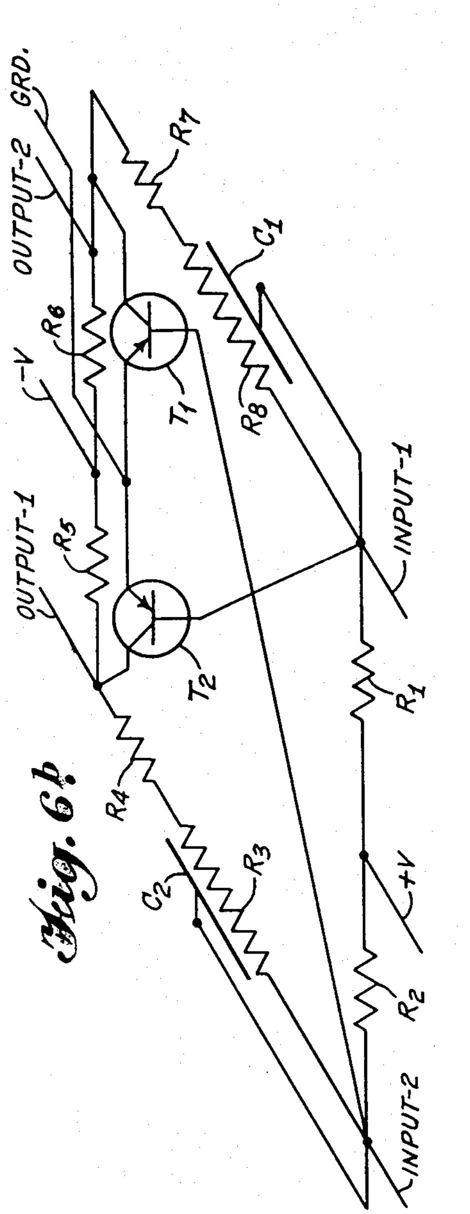
Figure 7:
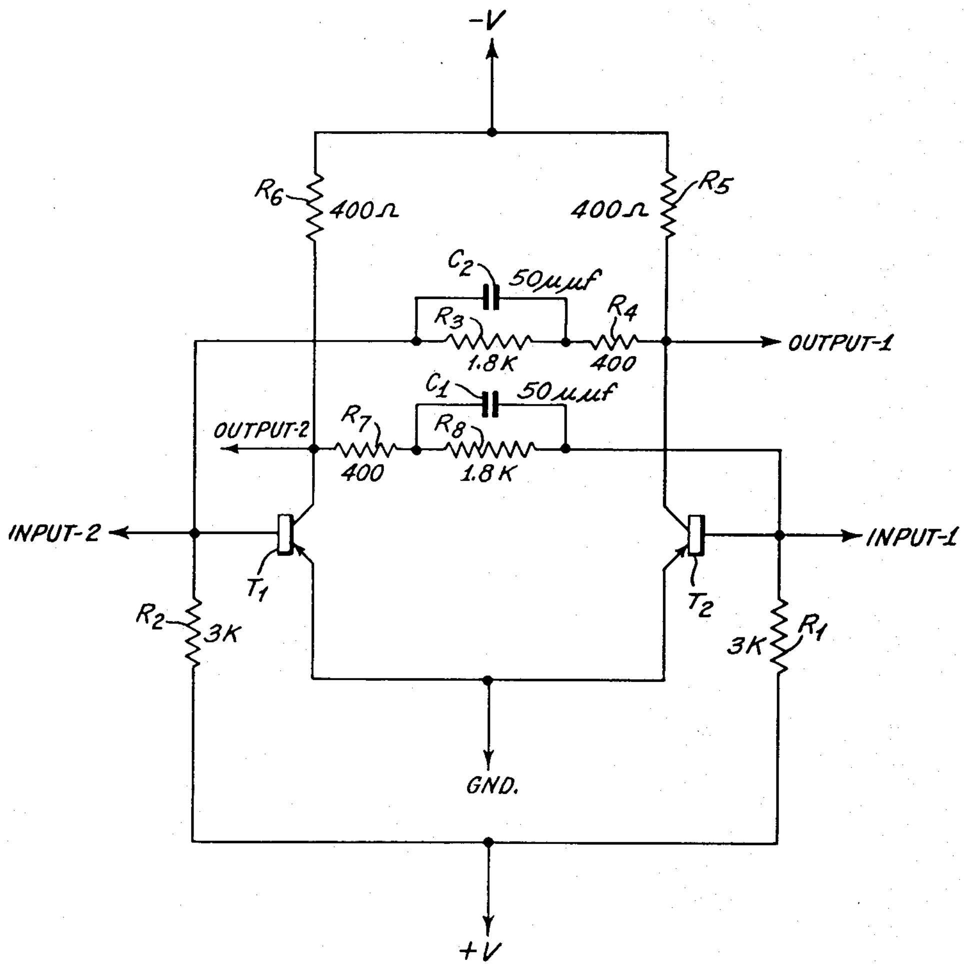
Figures 8A, 8B, 8C:
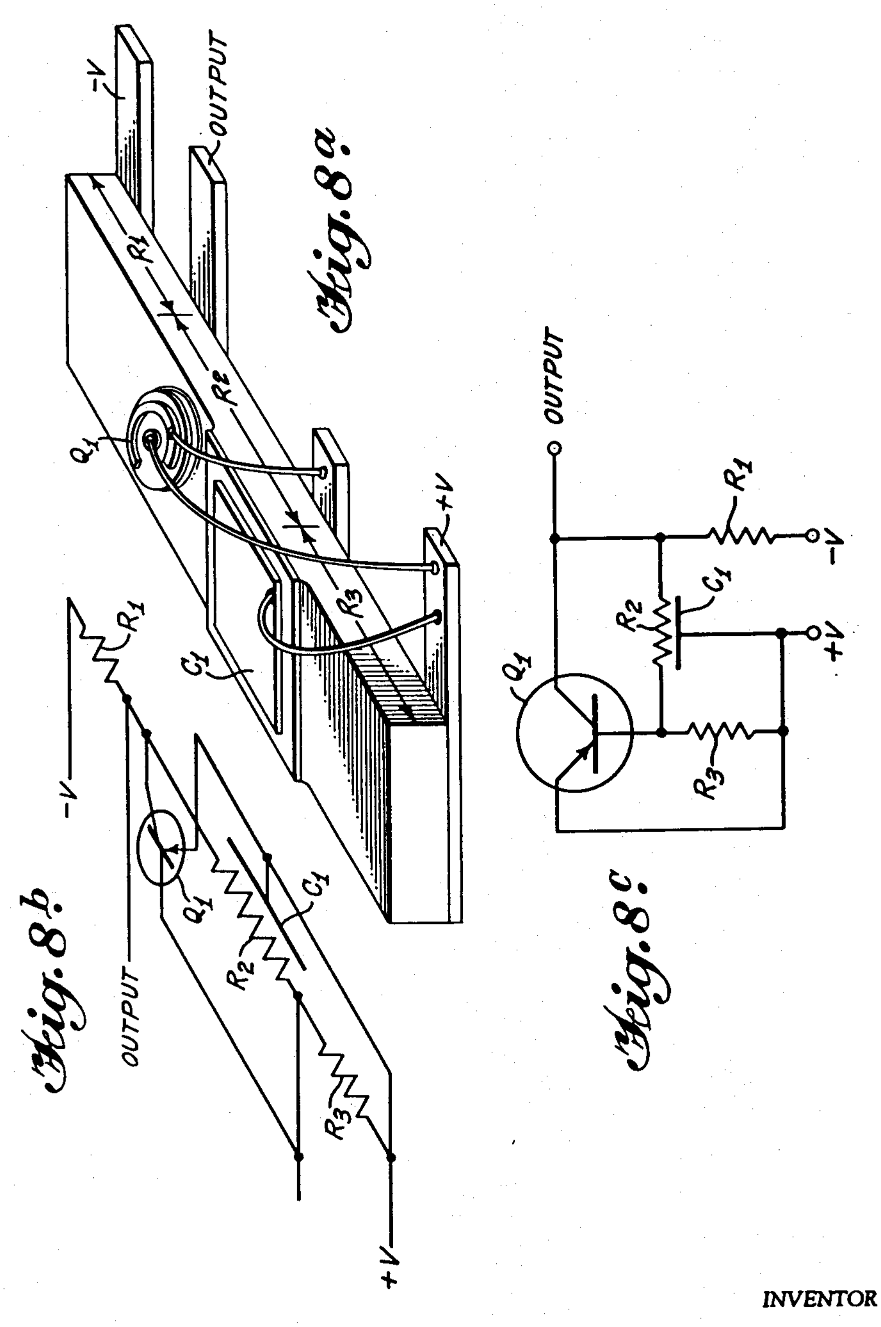

The foregoing and other objects and features of the invention will become more readily apparent from the following detailed description of preferred embodiments of the present invention when taken in conjunction with the appended drawings, in which:

FIGURES 1–5*a* illustrate schematically various circuit components fabricated in accordance with the principles of the present invention in order that they may be integrated into, or as they constitute parts of, a single body of semiconductor material;

FIGURE 6*a* illustrates schematically a multivibrator circuit fabricated in accordance with the present invention;

FIGURE 6*b* shows the wiring diagram for the multivibrator circuit of FIGURE 6*a* laid out in the same relationship;

FIGURE 7 illustrates the wiring diagram of the multivibrator circuit of FIGURE 6*a* in a more conventional presentation;

FIGURE 8*a* illustrates schematically a phase shift oscillator fabricated in accordance with the principles of the present invention;

FIGURE 8*b* shows the wiring diagram for FIGURE 8*a* with the components laid out in the same relationship; and FIGURE 8*c* portrays the wiring diagram of the phase shift oscillator.

As will be apparent to one skilled in the art, circuit components can be classified according to their circuit functions. Thus, circuit elements may be thought of as being active or passive in nature. According to "The Encyclopedic Dictionary of Electronics and Nuclear Engineering," edited by Sarbacher, and published by Prentice-Hall, active elements are those which in an impedance network act as current generators; whereas passive elements do not so act. Examples of active elements are photocells and transistors; examples of passive elements are resistors, capacitors and inductors. Diodes, while most often employed as passive elements, may if suitably biased and energized, function in an active capacity. Varactor diodes and tunnel diodes are examples of diodes operating in an active capacity. The term "circuit" (or "network") means two or more discrete circuit elements electrically connected together; and by "discrete circuit element" is meant a resistor, capacitor, inductor, diode, transistor or the like that is formed separately or purposely as distinguished from existence as a function incidentally, accidentally or inherently as a part of some other circuit element, as, for example, every transistor may be said to exhibit some resistance and capacitance along with its transistor action.

Referring now to the drawings in detail, preferred embodiments of the present invention will now be described in detail in order that a better understanding of the principles of the invention and the various forms and embodiments of the invention will be better understood.

As noted previously, the invention is primarily concerned with miniaturization of electronic circuits. Also, as noted, the invention contemplates the use of a body of semiconductor material appropriately shaped, electrically and physically and having formed therein a p-n junction or junctions and the use of component designs for the various circuit elements or components which can be integrated into or which constitute parts of the aforesaid body of semiconductor material.

FIGURES 1–5 inclusive illustrate in detail circuit elements formed in accordance with the principles of this invention which can be integrated into a body of semiconductor material. It is noted at this point that the body of semiconductor material is of single crystal structure, and can be composed of any suitable semiconductor material. There may be mentioned as examples of suitable materials germanium, silicon, intermetallic alloys such as gallium arsenide, aluminum antimonide, indium antimonide, as well as others.

Referring particularly to FIGURE 1, there is shown a typical design for a resistor which may be embodied or integrated into a body of single crystal semiconductor material. As noted in FIGURE 1, the design contemplates utilizing the bulk resistance of a body 10 of semiconductor material of any conductivity type. Contacts 11 and 12 are made ohmically to one surface of the body 10, spaced apart a sufficient distance to achieve a desired resistance. As will be apparent to one skilled in the art, ohmic connections are those which exhibit symmetry and linearity in resistance to flow of current therethrough in any available direction. If two resistors are to be connected together, it is not necessary to provide separate terminations for the common point. The resistance may be calculated from $$R = \rho L / A$$

where L is the active length in centimeters, A is the cross sectional area, and $\rho$ is the resistivity in ohm-cm. of the semiconductor material.

Figure 1A:
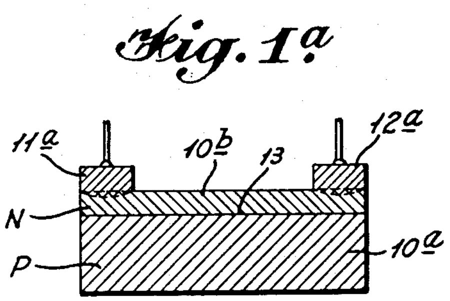

In addition to the resistor shown in FIGURE 1, a resistor may be provided as shown in FIGURE 1*a* for integration into and as forming a part of a body of semiconductor material. In FIGURE 1*a*, there is shown a body **10*a* of p-type semiconductor material with an n-type region 10*b* formed therein. Of course, between the body 10*a* and region 10*b* there is a p-n junction which is designated by the numeral 13. Contacts 11*a* and 12*a* are made to one surface of the region 10*b*, spaced apart from each other in order to achieve a desired resistance. As in FIGURE 1, the contacts 11*a* and 12*a* are ohmic contacts to the region 10*b***. A resistor formed in the manner of FIGURE 1*a* has several important advantages. First, the p-n junction 13 provides a barrier to current flow from the n-type region **10*b* into the p-type body 10*a* and, thus, the current flow is confined to a path in the n-type region 10*b* between the contacts thereto. The second advantage is that the total resistance value thereof can be controlled to a large degree. The total resistance value may be controlled by etching very lightly over the entire surface to remove the uppermost portion of the n-type region 10*b*, being very careful to not etch through the p-n junction, and as well by selectively etching to or through the p-n junction 13** thereby effectively to increase the length of the path traveled by the current between the contacts. The third, and perhaps major, advantage in forming a resistor according to FIGURE 1*a* is in that, by controlling the doping level or impurity concentration in the n-type region **10*b*, lower and more nearly constant temperature coefficients may be provided for the resistor. The above description has been in terms of a p-type body 10*a* and an n-type region 10*b* but it is obvious that the body 10*a* could be equally as well of n-type conductivity and the region 10*b*** of p-type conductivity. Resistors according to FIGURE 1*a* may be formed as separate circuit elements or components.

Figure 2:
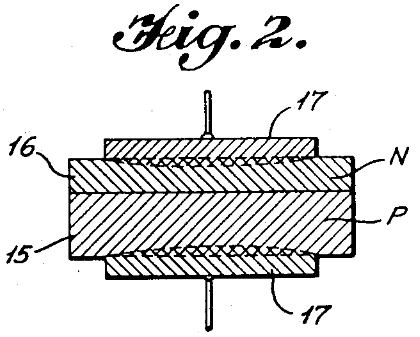

Capacitor designs may be obtained by utilizing the capacitance of a p-n junction, as shown in FIGURE 2, wherein a semiconductor wafer 15 of p-type conductivity is shown containing an n-type diffused layer 16. Ohmic contacts 17 are made to opposite faces of the wafer 15. The capacitance of a diffused junction is given by $$C = A\epsilon\left(\frac{qa}{12\epsilon V}\right)^{1/3}$$

where A is the area of the junction in square cm., $\epsilon$ is the dielectric constant, $q$ is electronic charge, where $a$ is the impurity density gradient, and V is the applied voltage.

Figure 2A:
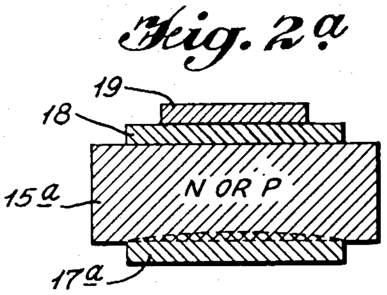

Instead of the capacitor of FIGURE 2, capacitance in a body of single crystal of semiconductor material may be provided as shown and described in connection with FIGURE 2*a*. FIGURE 2*a* shows a body **15*a* of semiconductor material, of either n- or p-type conductivity, which constitutes one plate of the capacitor. Evaporated onto the body 15*a* is a layer 18 providing a dielectric layer for the capacitor. It is necessary that the layer 18 have a suitable dielectric constant and be inert when in contact with the semiconductor body 15*a*. Silicon oxide has been found to be a suitable material for dielectric layer 18 and may be applied by evaporation or thermal oxidation techniques onto body 15*a*. Plate 19 forms the other plate of the capacitor and is provided by evaporating a conductive material onto layer 18. Gold and aluminum have been found to be satisfactory materials for the plate 19. Ohmic contact 17*a* is made to the body of semiconductor material 15*a* and contact to plate 19** may be made by any suitable electrical contact (not shown). Capacitors formed in the manner described in connection with FIGURE 2*a* have been found to exhibit much more stable characteristics than pure junction capacitors, that is, p-n junction capacitors, and, of course, may be fabricated as separate elements or components.

Capacitors produced in the manner of FIGURE 2 are also diodes, and must therefore be properly polarized in the circuit. Non-polar capacitors may be made by connecting two such areas back-to-back. Although junction capacitors have a marked voltage dependence, such dependence is present to a lesser degree for low voltages in the non-polar configuration.

Figure 3:
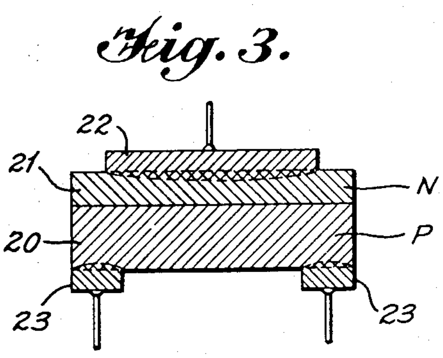

Resistor and capacitor designs may be combined to form a distributed R-C network. Such is shown in FIGURE 3, wherein a wafer 20 of p-type conductivity having an n-type conductivity diffused layer 21 formed therein is provided with a broad area contact 22 on the face and spaced contacts 23 on the opposite face. These networks are useful for low pass-filters, phase shift networks, coupling elements, etc. Their parameters may be calculated from the equations above. Other configurations of this general type are also possible.

Figure 5:
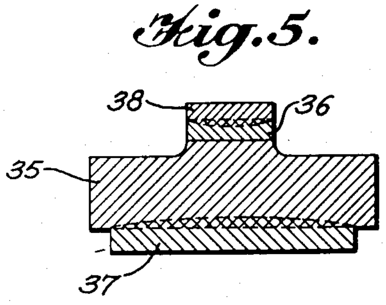
Figure 4:
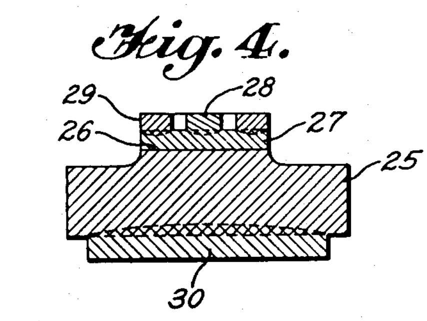

Transistors and diodes may be formed on a wafer, as described by Lee in "Bell System Technical Journal," vol. 35, p. 23 (1956). This reference describes a transistor, as shown in FIGURE 4, which has a collector region 25, a diffused p-n junction 26, a base layer 27, an emitter contact 28 for a rectifying connection with base layer 27 and base and collector contacts 29 and 30, respectively. The base layer 27 is formed as a mesa of small cross section. A diode of similar design is shown in FIGURE 5, and consists of a region 35 of one type conductivity, a mesa region 36 of opposite conductivity type with a p-n diffused junction formed therebetween and contacts 37 and 38 to each region.

Figure 5A:
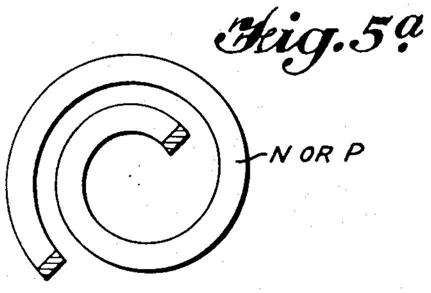

Small inductances, suitable for high frequency use, may also be made by shaping the semiconductor as evidenced by FIGURE 5*a* which shows a spiral of semiconductor material. It is also possible to prepare photosensitive, photoresistive, solar cells and other like components utilizing the considerations outlined above.

Although all of the circuit elements have been described in terms of a single diffused layer, it is quite possible to use a double diffused structure. Thus, double diffusion may be employed to form both n-p-n and p-n-p structures. Moreover, any suitable substances can be used for the semiconductor materials, conductivity producing impurities, and contact materials; and suitable and known processing can be exploited in producing the above circuit designs.

Because all of the circuit designs described above can be formed from a single material, a semiconductor, it is possible by physical and electrical shaping to integrate all of them into a single crystal semiconductor wafer containing a diffused p-n junction, or junctions, and to process the wafer to provide the proper circuit and the correct component values. Junction areas for the transistors, diodes, and capacitors are formed by properly shaped "mesas" on the wafer.

A specific illustration of an electronic circuit embodying the principles of the invention is shown in FIGURE 6*a*. As shown, a thin wafer of single crystal semiconductor material containing a diffused p-n junction has been processed and shaped to include a complete and integrated multivibrator electronic circuit formed essentially in one surface of the wafer. The regions of the wafer have been marked with symbols representative of the circuit element functions that are performed in the various regions. FIGURE 6*b* shows a wiring diagram of the various circuit functions in the relationship which they occupy in the wafer of FIGURE 6*a*. A more conventionally drawn circuit diagram is shown in FIGURE 7 with the circuit values actually used. The multivibrator circuit shown in FIGURES 6*a*, 6*b* and 7 will be described as illustrative of the processing techniques employed. First, a semiconducting wafer, preferably silicon or germanium, of the proper resistivity is lapped and polished on one side. For this design, 3 ohm-cm. p-type germanium was used. The wafer was then subjected to an antimony diffusion process which produced an n-type layer on the surface about 0.7 mil deep. The wafer was then cut to the proper size, 0.200 inch x 0.080 inch and the unpolished surface was lapped to give a wafer thickness of 0.0025 inch.

Gold plated Kovar leads 50 were attached by alloying to the wafer in the proper positions (as shown). Kovar is a trade name for an iron-nickel-cobalt alloy. Gold was then evaporated through a mask to provide the areas 51–54 which provide ohmic contact with the n region, such as the transistor base connections and the capacitor contacts. Aluminum was evaporated through a properly shaped mask to provide the transistor emitter areas 56, which form rectifying contacts with the n layer.

The wafer was then coated with a photosensitive resist or lacquer, such as Eastman Photo Resist, supplied by Eastman Kodak Company, and exposed through a negative to a light. The lacquer image remaining after development was used as a resist for etching the wafer to the proper shape. In particular, this etching forms a slot through the wafer to provide isolation between $R_1$ and $R_2$ and the rest of the circuit and also shapes all of the resistor areas to the previously calculated configuration. Either chemical etching or electrolytic etching may be used, although electrolytic etching appears to be preferable.

After this step, the photoresist was removed with a solvent and the mesa areas 60 masked by the same photographic process. The water was again immersed in etchant and the n layer completely removed in the exposed areas. A chemical etch is considered preferable. The photoresist was then removed.

Gold wires 70 were then thermally bonded to the appropriate areas to complete the connections and a final clean-up etch given. Instead of using the gold wires 70 in making electrical connections, connections may be provided in other ways. For example, an insulating and inert material such as silicon oxide may be evaporated onto the semiconductor circuit wafer through a mask either to cover the wafer completely except at the points where electrical contact is to be made thereto, or to cover only selected portions joining the points to be electrically connected. Electrically conducting material such as gold may then be laid down on the insulating material to make the necessary electrical circuit connections.

After testing, the circuit may be hermetically sealed, if required, for protection against contamination. The finished device was smaller by several orders of magnitude than any others which have previously been proposed. Because the fabrication steps required are quite similar to those now used in manufacturing transistors and because of the relatively small number of steps required, these devices are inherently inexpensive and reliable, as well as compact.

A further illustration of the process hereof is shown in FIGURES 8*a*–8*c*. Each area of the single crystal semiconductor wafer has been marked with a symbol for the circuit element which it represents. This unit illustrates the use of resistors, transistors, and a distributed R-C network to form a complete phase shift oscillator.

It must be emphasized that the two embodiments described above are merely two of innumerable circuits which can be fabricated by the techniques of the present invention. There is no limit upon the complexity or configuration of circuits which can be made in this manner. While there is a limit upon the types and values of components which can be made in a limited space, the invention hereof nevertheless represents a remarkable improvement over the prior art. As evidence of the advance in the art accomplished by the present invention, it is possible using the techniques described above to achieve component densities of greater than thirty million per cubic foot as compared with five hundred thousand per cubic foot which is the highest component density attained prior to this invention.

Although the invention has been shown and described in terms of specific embodiments, it will be evident that changes and modifications are possible which do not in fact depart from the inventive concepts taught herein. Hence, such changes and modifications are deemed to fall within the purview of the invention.

What is claimed is:

1. In an integrated circuit having a plurality of electrical circuit components in a wafer of single-crystal semiconductor material, a plurality of junction transistors defined in the wafer, each transistor including thin layers of semiconductor material of opposite conductivity-types adjacent one major face of the wafer providing a base and an emitter region which overlie a collector region, the base-emitter and base-collector junctions of each of said transistors extending wholly to said one major face, a plurality of thin elongated regions of the wafer exhibiting substantial resistance to provide semiconductor resistors, the elongated regions being spaced on said one major face from the transistors, and conductive means connecting selected ones of the elongated regions to regions of selected ones of the transistors.

2. In a semiconductor device which includes a single-crystal semiconductor wafer: a junction transistor provided adjacent one major face of the wafer by thin layers of semiconductor material of opposite conductivity types overlying one another and extending to said one major face with the emitter-base and base-collector junctions of the transistor extending wholly to said one major face; and a resistor provided in the wafer by a discrete elongated region of the semiconductor material which is spaced from the transistor on said one major face.

3. An integrated circuit comprising a wafer of semiconductor material containing a plurality of electrical circuit components including at least one active circuit component and at least one passive circuit component, the active circuit component including at least two thin layers of semiconductor material of opposite conductivity-types extending to one major face of the wafer with p-n junctions of the active circuit component extending wholly to said one major face, the passive circuit component including at least one discrete region of the semiconductor material of the wafer which is spaced on said one major face away from the thin layers of the active component, substantial electrical impedance being exhibited between the semiconductor material contiguous to the at least one discrete region of the passive component and semiconductor material immediately underlying said thin layers of the active component.

4. An integrated circuit according to claim 3 wherein said active circuit component is a junction transistor, said passive circuit component is an elongated resistor region, and said semiconductor material immediately underlying said thin layers of the active component defines the collector region of the junction transistor.

5. An integrated circuit according to claim 3 which further comprises: at least one other active circuit component provided in the wafer and including at least two thin layers of semiconductor material of opposite conductivity-types extending to said one major face with p-n junctions of such other active circuit component extending wholly to said one major face; and at least one other passive circuit component provided in the wafer and including at least one discrete region of the semiconductor material which is spaced on said one major face away from the thin layers of the at least one other active component.

6. An integrated circuit according to claim 5 wherein said discrete regions of said passive circuit components include thin surface-adjacent regions at said one major face of the wafer.

7. An integrated circuit according to claim 3 wherein the at least one discrete region of the passive circuit component includes a thin surface-adjacent layer of semiconductor material.

8. An integrated circuit according to claim 7 wherein the passive circuit component is a resistor.

9. An integrated circuit according to claim 3 wherein at least one of said circuit components includes a thin layer of dielectric material overlying said one major face of the wafer with a thin layer of conductive material overlying the dielectric material.

10. A semiconductor device comprising: a body of single-crystal semiconductor material; an active circuit component provided adjacent one major face of the body and including thin regions of the semiconductor material which extend to said one major face, each of such regions being of different conductivity than adjoining semiconductor material with the interface between each such region and other of the semiconductor material of the body extending wholly to said one major face; a passive circuit component provided in the body by a discrete portion of the semiconductor material which is spaced from the active circuit component on said one major face, substantial electrical impedance existing through the body between said thin regions of the active circuit component and the discrete portion of the passive circuit component.

11. A semiconductor device according to claim 10 wherein at least part of said substantial electrical impedance is exhibited by at least one p-n junction within the wafer.

12. An integrated circuit comprising a wafer of single-crystal semiconductor material having a plurality of electrical circuit components therein, the components including an active circuit component which comprises thin regions of semiconductor material of opposite conductivity-types closely adjacent one major face of the wafer with p-n junctions between such thin regions extending wholly to said one major face, the components further including a semiconductor resistor provided by a discrete elongated region of the wafer which is spaced on said one major face from the active circuit component, and a conductive lead connecting an end of the elongated region to one of the thin regions of the active circuit component.

13. In an integrated circuit having a plurality of circuit components in a wafer of single-crystal semiconductor material, a pair of junction transistors defined in the wafer with each transistor including thin layers of alternate conductivity type adjacent one major face of the wafer providing a base and an emitter region which overlie a collector region, the base-emitter and collector-base junctions of each of said transistors extending wholly to said one major face, elongated semiconductor means defined in the wafer and exhibiting substantial resistance to provide load resistor means for the pair of transistors, first conductive means connected to the collector region of one of the transistors and to an end of the elongated semiconductor means, second conductive means connected to the collector region of the other one of the transistors and to an end of the elongated semiconductor means, means including contacts to the emitter regions of the transistors and to the elongated semiconductor means for applying operating bias to the transistors and means including separate contacts on said base regions for applying inputs to said pair of transistors.

14. In an integrated circuit according to claim 13 first and second elongated semiconductor regions defined in the wafer and exhibiting substantial resistance to provide base resistors for the pair of transistors, and conductive means separately connecting an end of the first elongated region to the base region of one of the transistors and an end of the second elongated region to the base region of the other of the transistors.

15. An integrated circuit ahving a plurality of electrical circuit components in a wafer of single-crystal semiconductor material, at least one of the components being an active circuit component which includes thin layers of semiconductor material of alternate conductivity types defined in the wafer adjacent one major face thereof with p-n junctions of such active circuit component extending wholly to said one major face, at least one of the components being a passive circuit component which includes at least one discrete region defined in the wafer, the passive circuit component being spaced on said one major face from the active circuit component, substantial electrical impedance being exhibited through the wafer between the active circuit component and the passive circuit component, a plurality of interconnections between selected ones of the electrical circuit components, the circuit components and interconnections being so arranged and constructed as to allow, upon the application of electrical power, the performance within the structure of an electrical function equivalent to the function performed by a plural element electrical network.

16. An integrated circuit comprising a wafer of single-crystal semiconductor material containing a plurality of electrical circuit components defined in the wafer, the circuit components including an active circuit component which comprises at least two thin regions of the wafer of opposite conductivity-types each extending to one major face with the junction between each such thin region and other semiconductor material of the wafer extending to said one major face, the circuit components further including a passive circuit component which comprises at least one discrete region of the semiconductor material, the discrete region being spaced on said one major face from the thin regions of the active circuit component, non-common regions of the active and passive circuit components being interconnected to form at least part of an electrical circuit.

17. In a semiconductor device according to claim 2, said thin layers of said junction transistor being portions of a raised mesa-shaped part of said one major face.

18. An integrated circuit according to claim 3 wherein said active circuit component is a junction transistor with said two thin layers being the base and emitter regions of said junction transistor, the emitter region being substantially smaller than the base region on said one major face, a base contact being positioned on said base region spaced from the emitter region.

19. An integrated circuit according to claim 18 wherein said discrete region of the passive circuit component includes a thin surface-adjacent layer of semiconductor material of conductivity-type opposite that of subjacent semiconductor material, an ohmic contact is provided on said surface-adjacent layer, and a conductive lead connects such ohmic contact to said base contact.

20. A semiconductor device according to claim 10 wherein said passive circuit component provided in the body by said discrete portion of the semiconductor material includes a thin surface-adjacent portion of the semiconductor material at said one major face of the body, such thin portion being of conductivity differing from subjacent semiconductor material.

21. A semiconductor device according to claim 20 wherein separate electrical contacts are provided on at least two of said thin regions of the active circuit component on said one major face, wherein a contact is provided on said thin surface-adjacent portion on said one major face, and wherein conductive means interconnects said contact on said surface-adjacent portion with one of said contacts on said thin regions of the active circuit component.

22. In an integrated circuit according to claim 13 said elongated semiconductor means being a single elongated region of the semiconductor material with said first and second conductive means being separately connected to opposite ends of such elongated region and with said means for applying operating bias being connected to a centrally located portion of such elongated region.

23. In an integrated circuit according to claim 13 said means for applying inputs to said pair of transistors includes separate coupling means connecting the first conductive means to the contact on the base region of said one of the transistors and connecting the second conductive means to the contact on the base region of said other one of the transistors.

24. An integrated circuit according to claim 16 wherein said discrete region of the passive circuit component includes a thin surface-adjacent region of conductivity type opposite to that of subjacent semiconductor material.

25. An integrated circuit according to claim 24 wherein said passive circuit component is a P–N junction capacitor.

References Cited in the file of this patent

UNITED STATES PATENTS

| | | |
|---|---|---|
| 2,493,199 | Khouri | Jan. 3, 1950 |
| 2,748,041 | Leverenz | May 29, 1956 |
| 2,816,228 | Johnson | Dec. 10, 1957 |
| 2,817,048 | Thuermel | Dec. 17, 1957 |
| 2,824,977 | Pankove | Feb. 25, 1958 |
| 2,836,776 | Ishikawa | May 27, 1958 |
| 2,878,147 | Beale | Mar. 17, 1959 |
| 2,915,647 | Ebers | Dec. 1, 1959 |
| 2,916,408 | Freedman | Dec. 8, 1959 |
| 2,922,937 | Hutzler | Jan. 26, 1960 |
| 2,935,668 | Robinson et al. | May 3, 1960 |
| 2,995,686 | Selvin | Aug. 8, 1961 |
| 2,998,550 | Collins et al. | Aug. 29, 1961 |